(12) United States Patent
Yetka

(10) Patent No.: US 6,827,245 B1
(45) Date of Patent: Dec. 7, 2004

(54) AERODYNAMIC CONTAINER FOR SKIS AND SNOWBOARDS AND USED WITH A VEHICLE ROOF RACK

(76) Inventor: Chad J. Yetka, 821 S. High St., Denver, CO (US) 80209

( * ) Notice: Subject to any disclaimer, the term of this patent is extended or adjusted under 35 U.S.C. 154(b) by 100 days.

(21) Appl. No.: 10/389,734

(22) Filed: Mar. 13, 2003

(51) Int. Cl.$^7$ .................................................. B60R 9/04
(52) U.S. Cl. ........................ 224/316; 224/324; 224/328; 224/917.5; 280/814
(58) Field of Search ................................ 224/309, 319, 224/316, 324, 328, 917, 917.5; 206/315.1; 280/814

(56) References Cited

U.S. PATENT DOCUMENTS

| | | | | |
|---|---|---|---|---|
| 2,782,889 A | * | 2/1957 | Eber | 190/28 |
| 3,738,458 A | * | 6/1973 | Yount | 190/119 |
| 3,837,548 A | * | 9/1974 | Nerger | 206/315.1 |
| 3,889,861 A | * | 6/1975 | Fihn | 280/814 |
| 3,917,137 A | * | 11/1975 | Wilkins | 224/917 |
| 4,071,176 A | * | 1/1978 | Tuzee | 224/917.5 |
| 4,084,735 A | * | 4/1978 | Kappas | 224/328 |
| 4,238,063 A | * | 12/1980 | O'Dair | 206/315.1 |
| 4,867,361 A | * | 9/1989 | Burnham | 224/328 |
| 4,953,773 A | * | 9/1990 | Wirth | 224/316 |
| 5,160,075 A | * | 11/1992 | Moscovitch | 280/814 |
| 5,673,832 A | * | 10/1997 | Whalen | 224/917.5 |

* cited by examiner

Primary Examiner—Gary E. Elkins
(74) Attorney, Agent, or Firm—Edwin H. Crabtree; Ramon L. Pizarro; Donald W. Margolis

(57) ABSTRACT

An aerodynamic container adapted for receipt around a front portion of a pair of skis or a front portion of a snowboard, when the equipment is mounted on a vehicle ski rack. The container provides improved aerodynamic airflow with reduced wind noise and buffeting. The container helps improve vehicle fuel efficiency substantially by reducing the incremental drag of a loaded ski rack by up to 50 percent, while protecting valuable alpine equipment form potential damage during transit. The container includes a hard plastic housing having a split first housing member and an identical split second housing member. A bottom portion of the first housing member is hinged to a bottom portion of the second housing member for opening to the inside of the housing members. Top portions of the two housing members are releasably attached using hand operated release latches. The latches are used for securing the two housing members around the skis or snowboard. Inside a hollow interior of the two housing members is a plurality of removable ribs mounted in rib grooves molded along a length thereof. The ribs are made of soft rubber, flexible foam plastic and the like. The removable ribs have rib openings contoured for receiving a portion of the sides of the skis or snowboard for holding the equipment firmly inside the aerodynamic container.

19 Claims, 2 Drawing Sheets

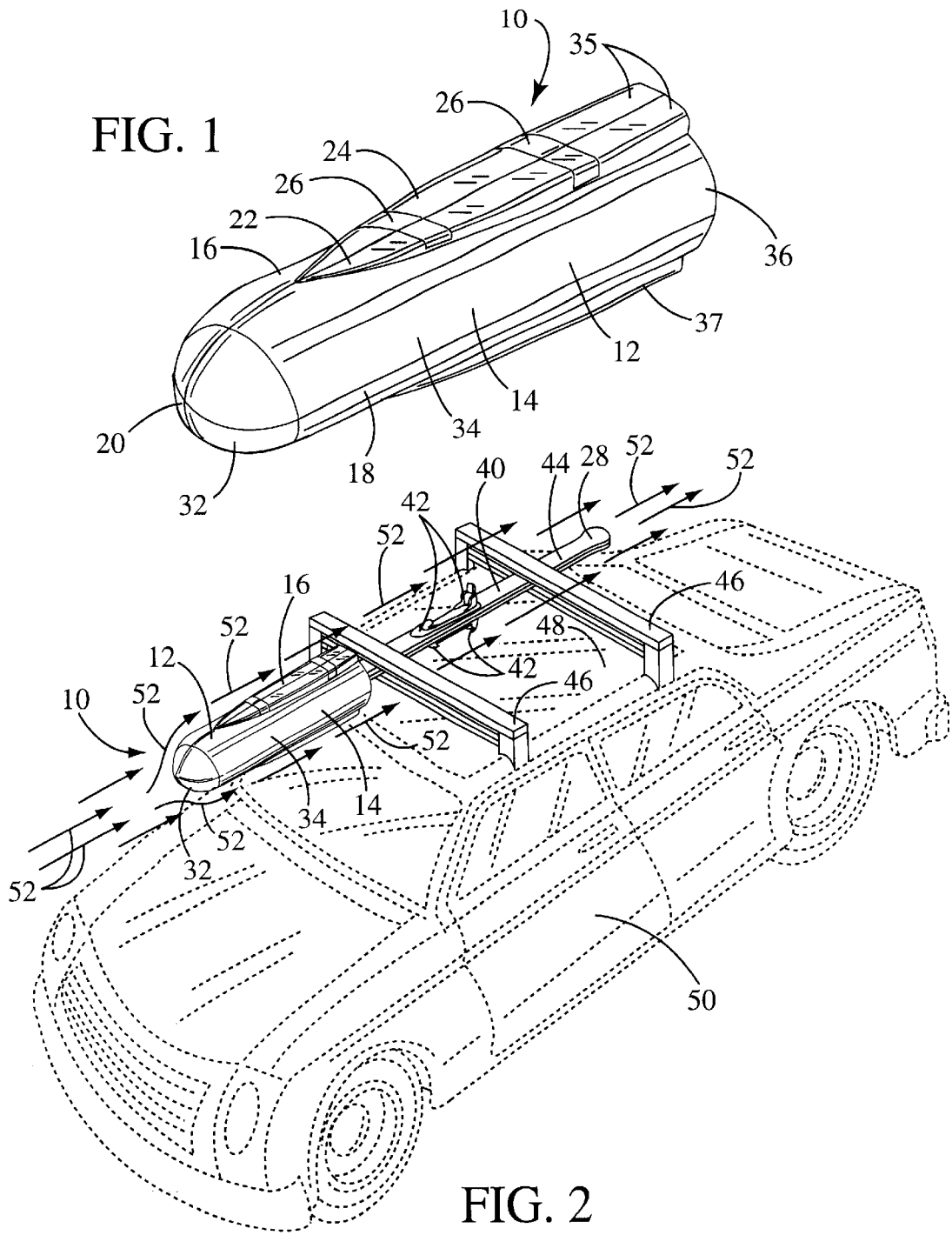

AERODYNAMIC CONTAINER FOR SKIS AND SNOWBOARDS AND USED WITH A VEHICLE ROOF RACK

BACKGROUND OF THE INVENTION (a) Field of the Invention

This invention relates to a housing for covering skis and snowboards and more particularly, but not by way of limitation, to an aerodynamic container for covering the front of a pair of skis or snowboards mounted on a vehicle roof rack.

(b) Discussion of Prior Art

Due to the large size of alpine skis and snowboards, this type of sports equipment is frequently transported to and from ski slopes on the exterior of a vehicle. Obviously, when being transported outside the vehicle, the equipment is subject to becoming dirty, snow encrusted and damaged.

There are basically three types of exterior racks and containers for mounting on the outside of the vehicle and holding skis and snowboards thereon. They are, for example, hitch mounted ski racks, enclosed car-top containers, often referred to as a ski boxes and the more popular and widely used roof mounted ski racks. The subject invention is used with the latter roof mounted ski racks. When using the three types of ski and snowboard racks and containers the following problems arise.

Vehicle fuel economy is decreased. At highway speeds, approximately two-thirds of the engine power required to maintain speed is used to overcome aerodynamic drag of the vehicle moving through the air. Roof mounted ski rack systems disturb clean airflow over the vehicle's roofline, increase the effective vehicle frontal area and increase the attendant aerodynamic drag. It is estimated that roof mounted ski racks can decrease fuel mileage, depending on the type of vehicle, by as much or more than 15 percent.

Vehicle wind noise and buffeting is increased. Air passing around, above and below skis and snowboards mounted on vehicle roof racks becomes turbulent, thereby increasing a perception of wind noise inside the vehicle. Because of the increased air turbulence, the vehicle can experience increased buffeting as the airflow over the roofline constantly changes.

Ski and snowboard equipment can be soiled and damaged. In ski rack systems that do not enclose the skis or snowboard, the equipment is exposed to potential damage, particularly during inclement driving conditions. This is particularly true when driving to and from winter sports destinations. Harsh chemicals, sand and other road materials used in road clearing are thrown up by passing vehicles, which can damage ski equipment that is not protected.

The subject invention is designed to address the above-mentioned concerns in transporting skis and snowboards to and from winter sports areas.

In U.S. Pat. No. 4,953,773 to Wirth, an elongated ski carrier is disclosed for mounting on top of a vehicle. The ski carrier is an elongated rigid tube divided into inside compartments for holding skis, ski poles and other equipment therein. In U.S. Pat. No. 6,311,883 to Greenburg, a ski case is disclosed having a front bag and a rear bag for holding the front and rear of a pair of downhill skis. In U.S. Pat. No. Des. 321,430 to Wirth and U.S. Pat. No. Des. 230,378 to Eisenberg, two different designs of ski carriers are illustrated. The two ski carriers enclose all of the skis. In U.S. Pat. No. Des. 333,724, a design of a combination of a ski carrier and a ski rack is illustrated for mounting on top of a vehicle. In U.S. Pat. No. 5,464,141 to Brindle, an elongated rooftop pipe container is shown. The container is used for holding various lengths of building materials such as PVC pipe.

None of the above mentioned prior art patents specifically disclose the unique features, structure and function of the subject aerodynamic container for mounting on the front of a pair of skis or on the front of a snowboard. The container is used in conjunction with a vehicle ski rack.

SUMMARY OF THE INVENTION

In view of the foregoing, it is a primary objective of the subject invention to mount around a front portion of a pair of skis or a snowboard for improved aerodynamic airflow, when the equipment is mounted on a vehicle ski rack. The improved airflow reduces vehicle wind noise and buffeting while decreasing the incremental drag of skis and snowboards attached to a roof ski rack by over 50 percent, thereby significantly increasing fuel economy.

Another object of the aerodynamic container is to protect the skis and snowboard from dirt, encrusted snow and chemical damage by covering the front of the skis and snowboard and directing airflow over the top of the skis and snowboard bindings.

Still another object of the container is that it is rugged in construction, weather, impact and corrosion resistant, streamlined in appearance, can be easily opened and mounted around the front of a pair of skis or snowboard. The exterior of the container can be used for advertising, carrying corporate and school logos and made in different colors.

The aerodynamic container is adapted for receipt around a front portion of a pair of skis or a front portion of a snowboard. The skis or snowboard are attached horizontally on a vehicle roof rack mounted on a vehicle. The container includes a hard plastic housing having a split first housing member and an identical split second housing member. A bottom portion of the first housing member is hinged to a bottom portion of the second housing member for opening to the inside of the housing members. Top portions of the two housing members are releasably attached using hand operated release latches. The latches are used for securing the two housing members around the skis or snowboards. Inside a hollow interior of the two housing members is a plurality of removable ribs mounted in rib grooves molded along a length thereof. The ribs are made of soft rubber, flexible foam plastic and the like. The removable ribs have rib openings contoured for receiving a portion of the sides of the skis or snowboards for holding the equipment firmly inside the aerodynamic container.

These and other objects of the present invention will become apparent to those familiar with various types of ski racks and containers used for holding skis and snowboards on top of a vehicle roof when reviewing the following detailed description, showing novel construction, combination, and elements as herein described, and more particularly defined by the claims, it being understood that changes in the embodiments to the disclosed invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of the principles thereof, and in which:

FIG. 1 is a front perspective view of the subject aerodynamic container in a closed position prior to receipt around a front portion of a pair of skis or a snowboard.

FIG. 2 is a perspective view of the container received around the front portion of a pair of skis attached to a ski rack or roof rack. The ski rack is shown mounted on the roof of a vehicle.

DETAILED DESCRIPTION OF THE PREFERRED EMBODIMENTS

Figure 3:
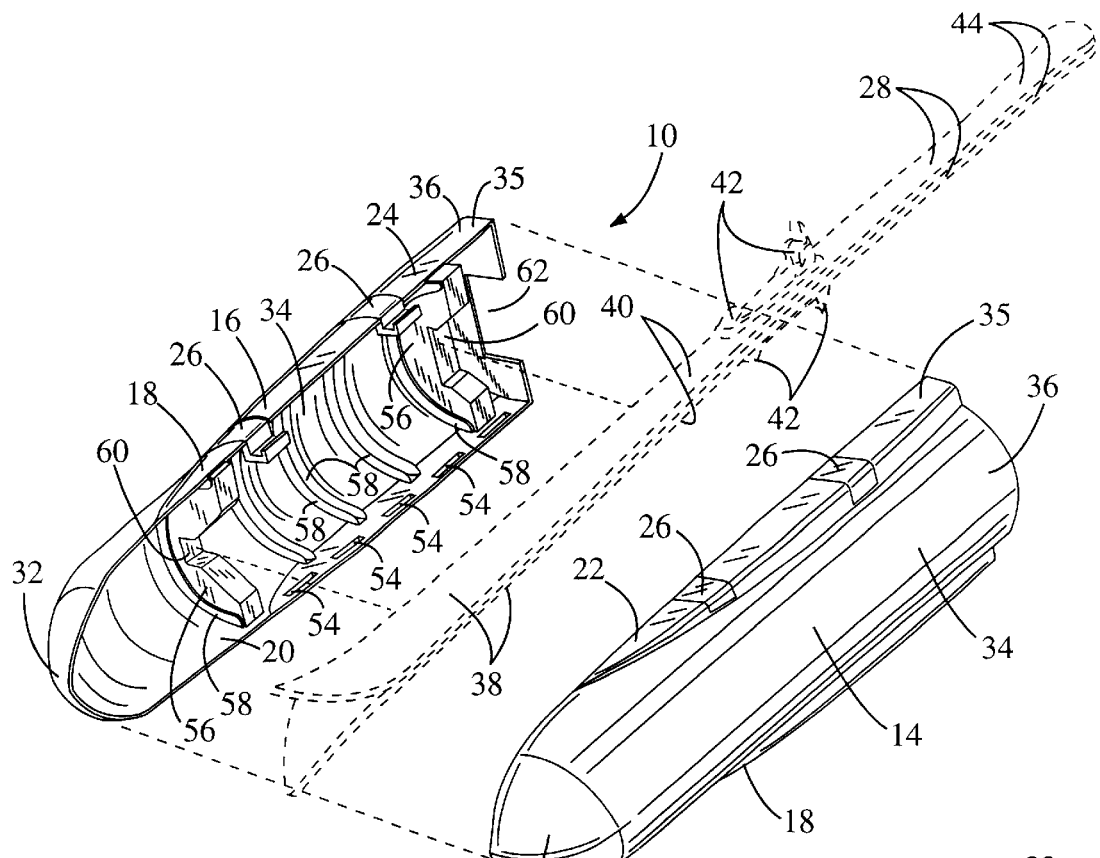
FIG. 3 is a perspective view of the container with a housing having a split first housing member and a second housing member. The two housing members are shown positioned for receipt around the front portion of the pair of skis.
Figure 4:
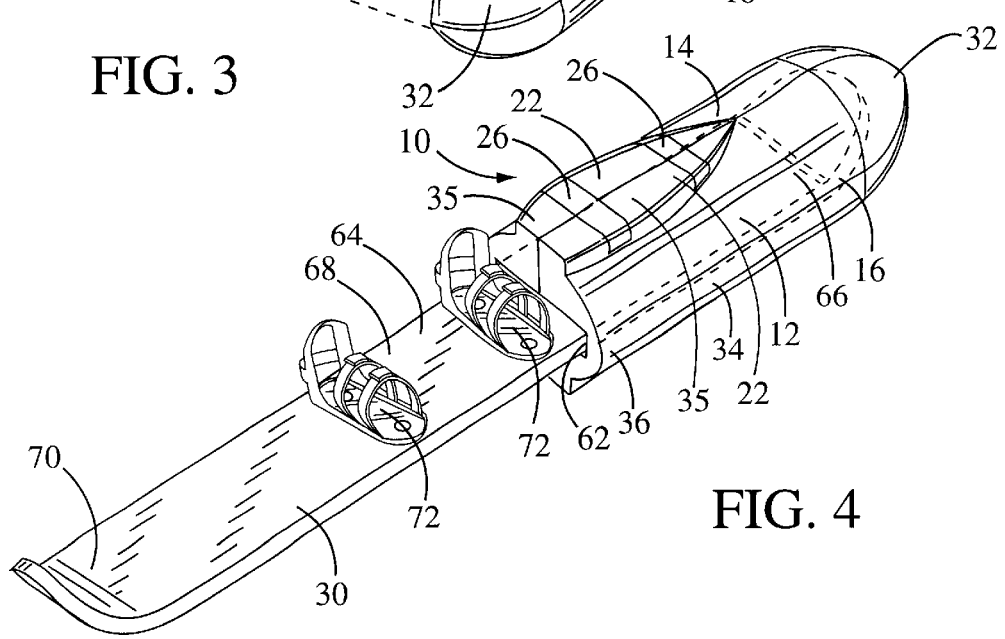
FIG. 4 is a rear perspective view of the container received around the front portion of a snowboard.

In FIG. 1, a front perspective view of the subject aerodynamic container is shown and having a general reference numeral 10. The aerodynamic container 10 broadly includes a hollow housing 12 made of molded hard plastic or like material. The hollow housing 12 includes a split first housing member 14 and an identical split second housing member 16. A bottom portion 18 of the first housing member 14 is hinged to a bottom portion 20 of the second housing member 16 for opening to the inside of the housing 12. A top portion 22 of the first housing member 14 is releasably attached to a top portion 24 of the second housing member 16 using a pair of hand operated release latches 26. The latches 26 are used for securing the two housing members 14 and 16 around a pair of skis 28 or snowboard 30. The skis 28 are shown in FIGS. 2 and 3 and the snowboard 30 is shown in FIG. 4. The two housing members 14 and 16 include a rounded front portion 32, a center portion 34 and a rear portion 36. Also, the two housing members 14 and 16 includes an upper flared portion 35 in the top of the center and rear portions 34 and 36 and a lower flared portion 37 in the bottom of the center and rear portions 34 and 36. The upper and lower flared portions 35 and 37 add to the aerodynamics of the exterior of the housing 14. The housing members 14 and 16 typically have a length in a range of 24 to 36 inches in length for covering the front portion of the skis or snowboard.

In FIG. 2, a perspective view of the aerodynamic container 10 is shown received around a front portion 38 of the skis 28. The front portion 38 of the skis 28 can be seen in FIG. 3. The skis 28 also include a center portion 40 with ski boot bindings 42 mounted thereon and a rear tail portion 44. The center portion 40 is shown received between the two major components of a horizontal vehicle ski rack 46. The ski rack 46 or roof rack is attached to a roof 48 of a vehicle 50. Obviously, the vehicle 50 may be an automobile, pickup truck, SUV and other types of vehicles used for transportation to and from ski areas.

In this drawing airflow, shown as arrows 52, can be seen engaging the rounded front portion 32 of the housing 12 and directed above and below the ski rack 46 and above and below the pair of skis 28. Because the housing 12 has an aerodynamic exterior surface across the rounded front portion 32 and along the length of the center portion 34 and rear portion 36, the airflow 52 is streamlined, air turbulence is reduced, wind resistance and wind noise are reduced along with reduction in buffeting. Also, the airflow 52 helps redirect dirt, road clearing chemicals and snow away from accumulating on the skis 28 and bindings 42. Further, and more importantly is through the use of the aerodynamic container 10, fuel efficiency of the vehicle 50 is greatly improved.

As mentioned above, the housing 12 can be molded in hard plastic in different colors and with a smooth exterior surface. Also, the exterior of the housing can be used for placing company and school logos thereon along with various types of advertising.

In FIG. 3, a perspective view of the container 10 is shown with the two split housing members 14 and 16 separated and positioned for receipt around the front portion 38 of the pair of skis 28. The bottom portion 18 of the first housing member 14 has been removed from hinges 54 attached to the bottom portion 20 of the second housing member 16. The hinges 54, when attached to the first housing member 14 allow the two housing members 14 and 16 to be opened, using the hand operated release latches 26, and spread apart from each other in a range of 120 to 180 degrees for easy access in wrapping the housing members around the front portion 38 of the skis 28. While the hinges 54 are shown for attaching the two housing members 14 and 16, it should be kept in mind that the two housings can be secured together equally well with various types of fasteners without departing from the spirit and scope of the invention.

Also shown in this drawing and inside a hollow interior of the two housing members 14 and 16 is a plurality of removable ribs 56 releasably mounted in rib grooves 58. The ribs 56 are made of soft rubber, foam plastic and the like. The rib grooves 58 are molded inside the center portion 34 of the housing members 14 and 16. The ribs 56 and rib grooves 58 in the first housing member 14 are not shown in the drawings. They are the same as the ribs and grooves shown in the second housing member 16. The removable ribs 56 include rib openings 60 therein. The rib openings 60 are contoured for receiving a portion of the sides of the skis 28 or a snowboard therein for holding the equipment firmly inside the container 10. The ribs 56 can be removed and reinserted into adjacent rib grooves 58 for proper adjustment of different lengths of skis and snowboards.

The rear portion 36 of the two housing members 14 and 16 include a ski and snowboard opening 62 for receipt around a portion of the skis 28 as shown in FIG. 2 and around the snowboard 30 shown in FIG. 4.

In FIG. 4, a rear perspective view of the container 10 is illustrated and received around a front portion 66 of a snowboard 30. While only a single snowboard 30 is shown in this drawing, it should be kept in mind that the container 10 can be easily adapted for holding the front portion of a pair of snowboards 30 similar to the container 10 holding the front portion of a pair of skis 28 as shown in FIG. 2. The front portion 66 of the snowboard 30 is shown in dashed lines. Extending from the rear portion 36 of the first and second housing members 14 and 16 and out the ski and snowboard opening 62 is a center portion 68 and a rear tail portion 70 of the snowboard 30. The center portion 68 is shown with a pair of snowboard boot bindings 72 mounted thereon. The subject aerodynamic container 10 works equally well in protecting the snowboard 30 or snowboards 30 when mounted on the ski rack 46 and compared to protecting the skis 28 mounted on the ski rack 46, as shown in FIG. 2.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiments of the invention for which as exclusive privilege and property right is claimed are defined as follows:

1. An aerodynamic container adapted for receipt around a front portion of a pair of skis or a front portion of a snowboard or snowboards when mounted on a horizontal vehicle ski rack, the container comprising:

a housing having a first housing member and a second housing member, said first housing member attached to said second housing member for opening to the inside of said housing members, said first and second housing members having a rounded front portion, a center portion and a rear portion, said rear portion having a ski and snowboard opening therein; and latch means attached to said first housing member and said second housing member for securing said housing members together;

whereby said first and second housing members are adapted for covering the front portion of the pair of skis or the front portion of the snowboard or snowboards when mounted on the horizontal ski rack.

2. The container as described in claim 1 wherein said first and second housing members have an aerodynamic exterior surface across the rounded front portion, center portion and rear portion thereof.

3. The container as described in claim 2 wherein said first and second housing members include an upper flared portion in a top of the center and rear portion and a lower flared portion in the bottom of the center and rear portion, said upper and lower flared portions adapted for directing airflow aerodynamically over ski or snowboard bindings mounted on the skis or snowboard.

4. The container as described in claim 1 wherein said first and second housing members are molded in hard plastic and in different colors.

5. The container as described in claim 1 wherein said first and second housing members have a length in a range of 24 to 36 inches.

6. The container as described in claim 1 wherein a hollow interior of said first and second housing members include a pair of removable ribs mounted in rib grooves along a length of the center portion of said housing members.

7. The container as described in claim 6 wherein said removable ribs include rib openings, said rib openings contoured for receiving a portion of sides of the skis or snowboard therein.

8. An aerodynamic container adapted for receipt around a front portion of a pair of skis or a front portion of a snowboard or snowboards when mounted on a horizontal vehicle ski rack, the container comprising:

a housing having a split first housing member and an identical split second housing member, a bottom portion of said first housing member hinged to a bottom portion of said second housing member for opening to the inside of said housing members, said first and second housing members having a rounded front portion, a center portion and a rear portion, said rear portion having a ski and snowboard opening therein; and latch means attached to a top portion of said first housing member and said second housing member for securing said housing members together;

whereby said first and second housing members are adapted for covering and enclosing the front portion of the pair of skis or the front portion of the snowboard or snowboards when mounted on the horizontal ski rack.

9. The container as described in claim 8 wherein said first and second housing members have an aerodynamic exterior surface across the rounded front portion, along a length of the center portion and along a length of the rear portion.

10. The container as described in claim 8 wherein said first and second housing members include an upper flared portion in a top of the center and rear portion and a lower flared portion in the bottom of the center and rear portion, said upper and lower flared portions adapted for directing air flow aerodynamically around and over ski or snowboard bindings attached to the skis or snowboards.

11. The container as described in claim 8 wherein said first and second housing members are molded in hard plastic and in different colors with a smooth exterior surface adapted for receiving advertising thereon.

12. The container as described in claim 8 wherein said first and second housing members have a length in a range of 24 to 36 inches and adapted for receiving different lengths of skis and snowboards therein.

13. The container as described in claim 8 wherein a hollow interior of said first and second housing members include a plurality of removable ribs mounted in rib grooves molded along a length of the center portion of said housing members.

14. The container as described in claim 13 wherein said removable ribs include rib openings, said rib openings contoured for receiving a portion of sides of the skis or the snowboard therein.

15. An aerodynamic container adapted for receipt around a front portion of a pair of skis or a front portion of a snowboard or snowboards when mounted on a horizontal vehicle ski rack, the container comprising:

a housing having a split first housing member and an identical split second housing member, a bottom portion of said first housing member hinged to a bottom portion of said second housing member for opening to the inside of said housing members, said first and second housing members having a rounded front portion, a center portion and a rear portion, said rear portion having a ski and snowboard opening therein;

a plurality of removable ribs mounted in rib grooves, said rib grooves molded along a length of an interior of the center portion of said housing members, said removable ribs having rib openings formed therein, said rib openings contoured for receiving a portion of sides of the skis or the snowboard therein;

a pair of hand operated latches attached to a top portion of said first housing member and said second housing member for securing said housing members together;

whereby said first and second housing members are adapted for covering the front portion of the pair of skis or the front portion of the snowboard when mounted on the horizontal ski rack.

16. The container as described in claim 15 wherein said first and second housing members have a smooth aerodynamic exterior surface across the rounded front portion, along a length of the center portion and along a length of the rear portion.

17. The container as described in claim 15 wherein said first and second housing members include an upper flared portion in a top of the center and rear portion and a lower flared portion in the bottom of the center and rear portion, said upper and lower flared portions adapted for directing airflow aerodynamically over ski or snowboard bindings mounted on the skis or snowboards.

18. The container as described in claim 15 wherein said first and second housing members are molded in different colors of hard weather resistant, corrosion resistent plastic, and housing members having a smooth aerodynamic exterior surface adapted for receiving advertising thereon.

19. The container as described in claim 15 wherein said first and second housing members have a length in a range of 24 to 36 inches and adapted for receiving the front portion of different lengths of skis and snowboards therein.

* * * * *